United States Patent [19]
James et al.

[11] Patent Number: 5,809,940
[45] Date of Patent: Sep. 22, 1998

[54] INDIRECT COOLING OF PRIMARY IMPACT TYPE SOLIDS SEPARATOR ELEMENTS IN A CFB REACTOR

[75] Inventors: David E. James, Barberton; David J. Walker, Wadsworth; Felix Belin, Brecksville, all of Ohio

[73] Assignee: The Babcock & Wilcox Company, New Orleans, La.

[21] Appl. No.: 864,233

[22] Filed: May 23, 1997

[51] Int. Cl.6 ............................. B09B 3/00; B01D 45/08
[52] U.S. Cl. ........................ 122/4 D; 110/245; 55/444
[58] Field of Search ....................... 122/4 D; 110/216, 110/245; 55/444

[56] References Cited

U.S. PATENT DOCUMENTS

| | | |
|---|---|---|
| 4,891,052 | 1/1990 | Belin et al. .............................. 55/444 |
| 4,992,085 | 2/1991 | Belin et al. .............................. 55/444 |
| 5,343,830 | 9/1994 | Alexander et al. ....................... 122/4 D |
| 5,378,253 | 1/1995 | Daum et al. ............................. 122/4 D |
| 5,435,820 | 7/1995 | Daum et al. ............................. 122/4 D |

*Primary Examiner*—Teresa J. Walberg
*Assistant Examiner*—Gregory A. Wilson
*Attorney, Agent, or Firm*—Robert J. Edwards; Eric Marich

[57] ABSTRACT

An improved CFB reactor or combustor arrangement has at least a first and a second group of impact type particle separators or U-beams with cooling surfaces located adjacent and immediately upstream of the second group of U-beams which serve to cool flue gas/solids flowing through the CFB before it reaches the second group of U-beams. By reducing the gas temperature in the vicinity of and entering the second group of U-beams, the U-beams can be made of less expensive materials and are thus less expensive to produce and maintain. The heat absorbed by the local cooling surfaces can be applied to heat a working fluid supplied to a turbine or other process.

9 Claims, 1 Drawing Sheet

INDIRECT COOLING OF PRIMARY IMPACT TYPE SOLIDS SEPARATOR ELEMENTS IN A CFB REACTOR

FIELD OF THE INVENTION

The present invention relates generally to the field of circulating fluidized bed (CFB) reactors or combustors. In particular, it relates to an improved CFB reactor or combustor arrangement having at least a first and second group of impact type particle separators or U-beams with cooling surfaces located adjacent and immediately upstream of the second group of U-beams to cool flue gas/solids flowing through the CFB before it reaches the second group of U-beams. By reducing the gas temperature in the vicinity of and entering the second group of U-beams, the U-beams in the second group can be less expensive to produce and maintain. The heat absorbed by the local cooling surfaces can be applied to heat a working fluid supplied to a turbine or other process.

BACKGROUND OF THE INVENTION

It is known to position labyrinth type particle separators in gas streams having suspended particulate matter to separate the particulate from the gas stream. Often, the separators have collecting elements made of one or more plates shaped and placed in staggered arrays to present a path which may be navigated by the gas stream, but not the entrained particles.

One such type of particle separator is a staggered U-beam array, in which at least two rows of laterally spaced apart U-beams are oriented with the channels facing the gas stream. The gap between each adjacent pair of U-beams in one row is aligned with a U-beam in a preceding or following row of U-beams to present a tortuous path for the flue gas/solids to navigate. The U-beams in each row collect and remove particles from the flow of flue gas/solids, while the flue gas stream continues to flow around and through the U-beam array. See, for example U.S. Pat. No. 4,891,052 to Belin et al., assigned to The Babcock & Wilcox Company, the text of which is herein incorporated by reference as though fully set forth herein.

These types of collection elements are generally relatively long in comparison to their width and depth. The shape of the collection elements is usually dictated by two considerations: namely, the collection efficiency of the U-beams themselves and the ability of the U-beams to be self-supporting. When these elements are used, they are generally placed at the furnace exit and not cooled. Their placement at the furnace outlet is to protect the downstream heating surfaces from erosion by solid particles. Thus, the U-beams are exposed to the high temperatures of the flowing stream of flue gas/solids, and the materials used for the U-beams must be sufficiently temperature resistant to provide adequate support and resistance to damage. As a result, expensive high-alloy steels or other heat-resistant materials must be used, and the high temperature environment presents a continuing increased maintenance cost.

SUMMARY OF THE INVENTION

CFB reactors and combustors tend to have primary particle collection means located in hot regions following the furnace outlet. In order to use staggered particle separator arrays or U-beams in these regions, it would be desirable to dissipate some of the heat so that less expensive materials could be used for their construction, and also to avoid overheating the particle separator elements or U-beams during operation. It would be an additional advantage if the dissipated heat were put to use; for example, to heat a working fluid supplied to a turbine or other process.

It is thus an object of the present invention to provide an improved CFB reactor or combustor arrangement having at least two groups of U-beams, preferably a first and a second group, with cooling surfaces located adjacent and immediately upstream of at least the second group of U-beams to cool flue gas/solids flowing through the CFB before it reaches the second group of U-beams. By reducing the local gas temperature in the vicinity of and entering the second group of U-beams, the U-beams in the second group can be less expensive to produce and maintain.

Accordingly, one aspect of the present invention is drawn to an improved CFB reactor or combustor arrangement having impact type particle separators for separating solids particles from a flow of flue gas/solids flowing through the reactor enclosure, comprising: a reactor enclosure having an exit opening; a first group of at least two rows of staggered impact type particle separators located upstream of the exit opening with respect to the flow of flue gas/solids; a second group of at least two rows of staggered impact type particle separators located downstream of the exit opening; and a first cooling surface, located just downstream of the exit opening and adjacent and immediately upstream of the second group of particle separators for reducing the temperature of the flue gas/solids entering the second group of particle separators to reduce the operating temperature of the second group of particle separators.

The cooling surface may be water, water/steam, or steam-cooled, such as economizer, boiler, superheater or reheater tube banks. U-beams can be used for the particle separator elements.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

As used herein, the term CFB combustor refers to a type of CFB reactor where a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process.

Figure 1:
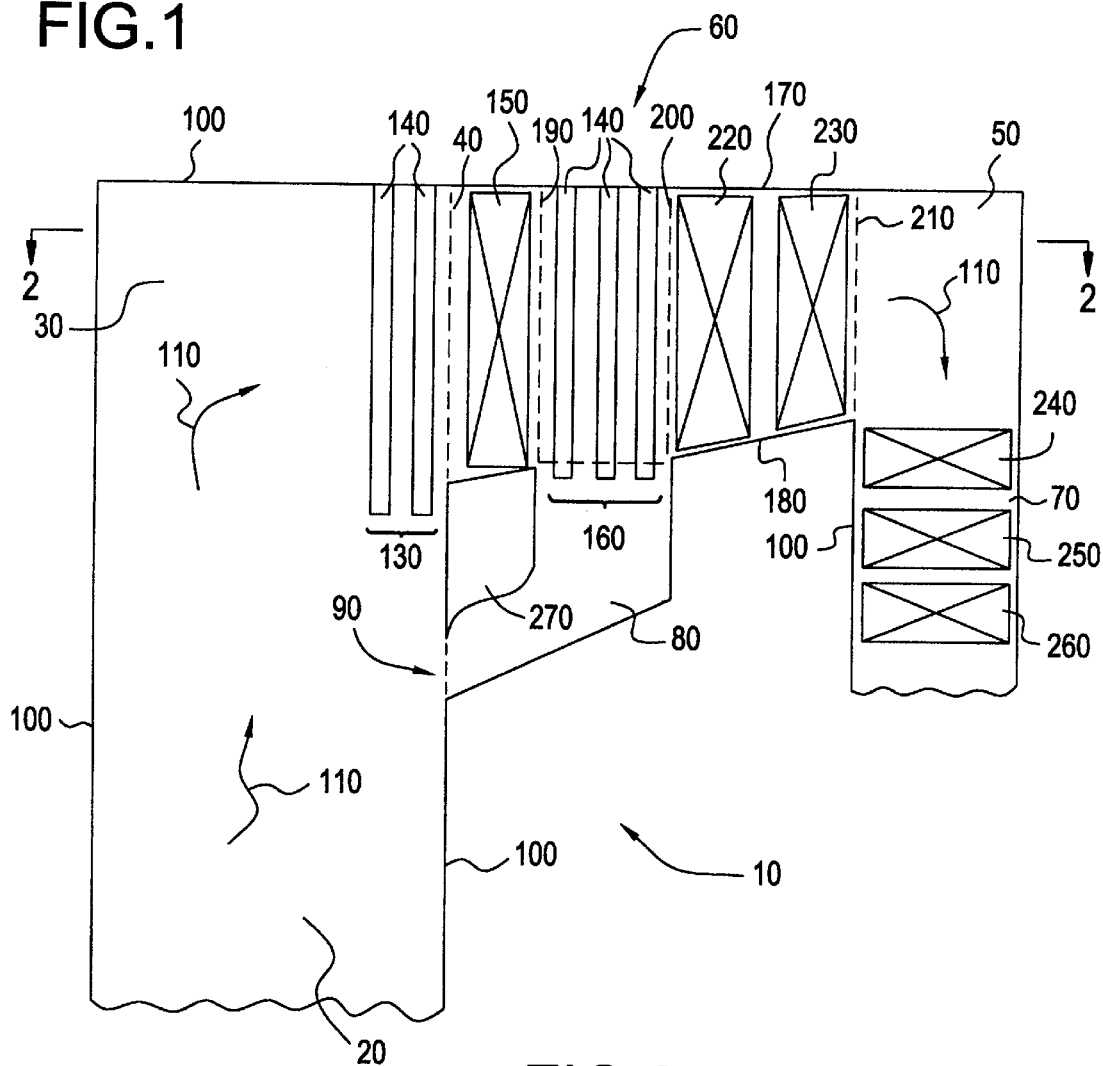
FIG. 1 is a schematic sectional side elevation view (not to scale) of a portion of a circulating fluidized bed (CFB) reactor or combustor according to the invention.

Referring generally to the drawings, wherein like reference numerals represent the same or functionally similar elements throughout the several drawings, and to FIG. 1 in particular, there is shown a circulating fluidized bed (CFB) reactor or combustor, generally designated 10, comprising a reactor enclosure 20 having an upper portion 30, an exit opening 40, a convection pass 50 having an upstream section 60 and a downstream section 70, and cavity means 80 having returning means 90 connected thereto. The front of the CFB reactor enclosure is defined as the left hand side of FIGS. 1 and 2; the rear is the right hand sides of these Figs, and the width of the CFB reactor enclosure 20 is perpendicular to the plane of FIG. 1. The reactor enclosure 20 is typically rectangular in cross-section and is defined by enclosure walls 100. Enclosure walls 100 are usually fluid cooled, being typically comprised of water and/or steam conveying tubes separated from one another by a steel membrane to achieve a gas-tight reactor enclosure 20. A flue gas/solids mixture 110 produced by the CFB combustion process occurring in a lower portion of the reactor enclosure 20 flows upwardly through the upper portion 30 and eventually out the exit opening 40 and into the convection pass 50. As the flue gas/solids mixture 110 travels along this path, it passes across several heat removal and solids particle removing stages, as will be herein described, before being passed to the atmosphere.

Located in the upper portion 30 of the reactor enclosure 20, in the direction of the flue gas/solids flow 110 and upstream of the exit opening 40, is a first group 130 (one or more rows, preferably two rows) of staggered impact type particle separators 140. The particle separators 140 are non-planar; they may be U-shaped, E-shaped, W-shaped or any other shape which presents a cupped or concave surface configuration to the flow of incoming flue gas/solids 110. Since the first group 130 of impact type particle separators are upstream of the exit opening 40, this first group 130 may also be referred to as the in-furnace U-beams 130. For the sake of convenience, the staggered impact type particle separators 140 will be generally referred to in the balance of the description as U-beams 140. The U-beams 140 are staggered with respect to one another such that the flue gas/solids flow 110 passes through them enabling the entrained solids particles to strike them and be collected in the cupped or concave portion, causing the particles collected by the first group 130 to free fall internally and directly down along the U-beams towards a bottom portion of the reactor enclosure 20. U-beams 140 also extend fully across the exit opening 40. U-beams 140 are typically made of stainless steel due to the high temperature environment.

According to the invention, a first cooling surface 150 is provided, positioned just downstream of the exit opening 40, to reduce the temperature of the flue gas/solids 110 before it is provided to an adjacent and immediately following second group 160 of impact type particle separators or U-beams 140. The U-beams 140 making up this second group 160 are preferably the same design as those comprising the first group 130, and are structurally and functionally similar to the arrangement disclosed in U.S. Pat. No. 5,343,830 to Alexander et al. (assigned to The Babcock & Wilcox Company). For further details concerning that aspect, the reader is referred to that patent, the text of which is herein incorporated by reference as though fully set forth herein. The U-beams 140 in this second group 160 of at least two rows of staggered impact type particle separators (preferably 4 rows), located downstream of the exit opening 40, collect particles from the flue gas/solids flow 110 and provide them into the cavity means 80 for transfer and eventual return to a lower portion of the reactor enclosure 20 via returning means 90. The walls of the cavity means 80 are also usually cooled, being typically formed from some of the reactor enclosure tubes 100 which form a rear wall of the reactor enclosure 20 and then extend upwardly towards a roof 170 of the convection pass 50. Some of these fluid-cooled enclosure tubes 100 may also be used to form a floor 180 of the upstream section 60, and the portions of these tubes which extend into the flow of flue gas/solids 110 in the convection pass 50 may be arranged, preferably in-line, to form what are referred to in the art as "screens" at the exit opening 40, and at other locations 190, 200 and 210 as shown in FIG. 1. The fluid-cooled tubes forming these screens are generally laterally spaced apart from one another, forming gas lanes (not shown) through which the flue gas/solids 110 flows. These screens may also be one or more rows deep, in the direction of flue gas/solids flow.

Figure 2:
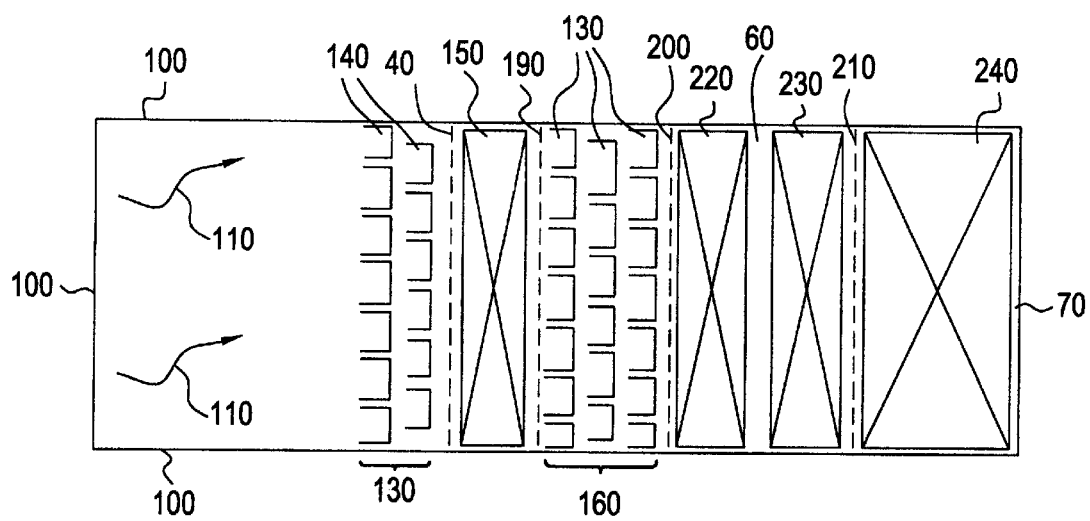
FIG. 2 is a schematic sectional plan view of FIG. 1 (also not to scale) viewed in the direction of arrows 2—2.

With reference to FIGS. 1 and 2, and continuing through the convection pass 60 in the direction of flue gas/solids 110 flow, heating surfaces such as superheater, reheater, boiler (water/steam), or even economizer surface, schematically shown in FIG. 1 as 220 and 230, may be provided. Since these heating surfaces 220, 230 are generally comprised of pendant banks of tubes, this upstream section 60 of the convection pass 50 is sometimes referred to as the pendant convection pass. The flue gas/solids 110 passing across these banks of tubes 220, 230 gives up a portion of the heat contained therein to the working fluid within the tubes comprising these banks 220, 230 to achieve the thermodynamic work required by any steam turbine or other process (not shown) associated with the CFB reactor or combustor 10. After passing across these pendant banks of tubes 220, 230, the flue gas/solids flow 110 is provided into the downstream section 70 of the convection pass 50. Downstream section 70 may also contain banks of tubes forming superheater, reheater, boiler (water/steam), or economizer surface, schematically shown in FIGS. 1 and 2 as 240, 250 and 260, and since these banks of tubes are generally arranged horizontally in this downstream section 70, it is sometimes referred to as the horizontal convection pass.

If desired, the concept of the present invention could be extended to provide a third group (not shown) of U-beams 140, located for example, in between the heating surfaces 220 and 230 of FIG. 1. It is understood that similar benefits would be achieved by providing the third group of U-beams 140 downstream of heating surface 220, since the temperature of the flue gas/solids 110 would again be reduced prior to entering this third group of U-beams 140; thus the heating surface 220 could be considered as "cooling" surface with respect to the U-beams 140.

The cooling surface 150 is positioned adjacent and immediately upstream of the U-beams group 160 and reduces the operating temperatures of the U-beams 140 forming same so that less expensive alloys (and which do not have to be as heat resistant) may be used. While various types of working fluids may be employed in the cooling surface 150, since relatively high gas temperatures are present, it is preferred that they be either superheater or reheater surface to take full advantage of these high gas temperature levels and further enhance the thermodynamic efficiency of the cycle. However, cooling surface 150 could also convey working fluids which are not part of the associated turbine cycle, and instead could be part of a separate circuit. As necessary, the tubes themselves forming the banks of tubes in cooling surface 150 may be coated with protective refractory or other coatings or provided with devices such as shields or deflectors to protect the tubes from erosion caused by the flue gas/solids 110 flowing there across.

Other advantages of the invention include improved stiffness provided to the furnace rear enclosure wall when the U-beam and cooled surface configuration of the invention is used. This may be accomplished by providing additional structure, possibly in the form of a vestibule 270 located below the cooling surface 150 as shown in FIG. 1. The increased stiffness allows for deeper cavity means 80 in the CFB. Further, by positioning the cooling surface 150 as shown in the upstream portion 60 of the convection pass 50, when the CFB is shut down for "black plant" conditions (loss of power to the associated power plant, not shown), the temperature of the CFB and the adjacent groups of U-beams is reduced much more quickly by the cooling surface 150. The faster temperature reduction allows repairs and inspections to begin earlier during a black plant condition. Providing the cooling surface 150 also protects the adjacent screen tubes during a black plant condition.

While a specific embodiment of the invention has been shown and described in detail to illustrate the application of the principles of the invention, it will be understood that the invention may be embodied otherwise without departing from such principles. For example, while the above description indicated that the first cooling surface could be at least one of superheater surface, reheater surface, boiler surface and economizer surface, the invention is not so limited. The first cooling surface could be comprised of one or more of these types of surfaces as necessary to tailor the heat absorption patterns throughout the CFB reactor or combustor 10. Accordingly, all such embodiments are fairly within the scope and equivalents of the following claims.

We claim:

1. An improved CFB reactor or combustor arrangement having impact type particle separators for separating solids particles from a flow of flue gas/solids flowing through the reactor enclosure, comprising:

a reactor enclosure having an exit opening;

a group of at least two rows of staggered impact type particle separators located upstream of the exit opening with respect to the flow of flue gas/solids;

a second group of at least two rows of staggered impact type particle separators located downstream of the exit opening; and a first cooling surface located just downstream of the exit opening and adjacent and immediately upstream of the second group of particle separators for reducing the temperature of the flue gas/solids entering the second group of particle separators to reduce the operating temperature of the second group of particle separators.

2. The improved CFB reactor or combustor arrangement of claim 1, wherein the cooling surface comprises at least one of superheater surface, reheater surface, boiler surface and economizer surface.

3. The improved CFB reactor or combustor arrangement of claim 1, wherein the second group of at least two rows of staggered impact type particle separators located downstream of the exit opening collects particles from the flue gas/solids flow and provides them to cavity means for eventual transfer to the reactor enclosure.

4. The improved CFB reactor or combustor arrangement of claim 1, wherein the impact type particle separators comprise U-beams.

5. The improved CFB reactor or combustor arrangement of claim 1, wherein the impact type particle separators comprise non-planar elements which are U-shaped, E-shaped, W-shaped or any other shape which presents a cupped or concave surface configuration to the flow of flue gas/solids.

6. The improved CFB reactor or combustor arrangement of claim 3, further comprising a vestibule located below the cooling surface.

7. The improved CFB reactor or combustor arrangement of claim 1, further comprising additional cooling surface located downstream of the second group of particle separators.

8. The improved CFB reactor or combustor arrangement of claim 7, wherein the additional cooling surface comprises at least one of superheater surface, reheater surface, boiler surface and economizer surface.

9. The improved CFB reactor or combustor arrangement of claim 1, further comprising fluid cooled screen tubes located at at least one of the following locations:

at the exit opening of the reactor enclosure, upstream of the second group of particle separators, and upstream of the additional cooling surface.

* * * * *